US006864862B2

(12) United States Patent
Sato et al.

(10) Patent No.: US 6,864,862 B2
(45) Date of Patent: Mar. 8, 2005

(54) STEREOSCOPIC DISPLAY SYSTEM FOR VIEWING WITHOUT SPECTACLES

(75) Inventors: Seiji Sato, Kanagawa (JP); Hidehiko Sekizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 10/149,264

(22) PCT Filed: Feb. 7, 2001

(86) PCT No.: PCT/JP01/00840
§ 371 (c)(1),
(2), (4) Date: Jun. 10, 2002

(87) PCT Pub. No.: WO01/59508
PCT Pub. Date: Aug. 16, 2001

(65) Prior Publication Data
US 2003/0048237 A1 Mar. 13, 2003

(30) Foreign Application Priority Data
Feb. 7, 2000 (JP) ....................................... 2000-029621

(51) Int. Cl.$^7$ ................................................ G09G 3/00
(52) U.S. Cl. ........................... 345/32; 348/51; 359/464; 359/465; 349/15
(58) Field of Search ............................. 345/32, 42, 51, 345/52, 58–60; 348/42–60; 349/15; 359/462, 464, 465

(56) References Cited
U.S. PATENT DOCUMENTS

| 4,346,962 A | * | 8/1982 | Holmes, Jr ................. 359/463 |
| 6,278,546 B1 | * | 8/2001 | Dubin et al. ................ 359/452 |

FOREIGN PATENT DOCUMENTS

| JP | 1 116521 | 5/1989 |
| JP | 7 128743 | 5/1995 |
| JP | 10 63199 | 3/1998 |
| JP | 10 333092 | 12/1998 |
| JP | 11 95166 | 4/1999 |

* cited by examiner

Primary Examiner—Amare Mengistu
Assistant Examiner—Tom Sheng
(74) Attorney, Agent, or Firm—Sonnenschein, Nath & Rosenthal LLP

(57) ABSTRACT

A light source (60) is provided in the rear of display means (30), which has a light transmission type display and is made up of pixels (31) for left and right eyes and a first image separation mechanism (32) for the left and right eyes, with a lens unit (41) having a collecting power in a vertical direction and a second image separation mechanism (52) therebetween. The transmission light from the light source (60) spreads in the vertical direction as shown in the drawing. Such spread of the light occurs over the whole of a display surface. It is therefore possible to view the image on the display surface, when the viewer's head is located at any of positions 1 to 4. Accordingly, it becomes possible to make a degree of freedom in vertical (up-and-down) positional movement of the viewer's head.

8 Claims, 12 Drawing Sheets

STEREOSCOPIC DISPLAY SYSTEM FOR VIEWING WITHOUT SPECTACLES

BACKGROUND OF THE INVENTION

The present invention relates to a display system for viewing without spectacles. More particularly, the present invention relates to a 3D display system for viewing without spectacles, capable of reproducing a three-dimensional image by means of two two-dimensional images having binocular parallax therebetween without the need for a viewer to wear special spectacles.

BACKGROUND ART

A display device in general use at present gives a two-dimensional image, although a person ordinarily observes a three-dimensional image by virtue of binocular parallax in reality. It has been therefore required to develop a display device having the ability to display parallactic information.

In order to reproduce a three-dimensional image by means of two two-dimensional images having binocular parallax therebetween, there have been proposed various methods in which separate images are projected onto left and right eyes, respectively. These methods include a method using special spectacles, a lenticular method and a parallax barrier method.

In the method using special spectacles, however, it is unavoidable to feel unpleasant as if foreign matter is put on. In the lenticular method and the parallax barrier method, there is a problem that the position of a viewer's head is limited owing to a stereoscopic radius of plus or minus few centimeters along a horizontal direction, so that it is more agonizing to limit the position of the viewer's head than to wear spectacles.

In view of the foregoing, there has been proposed, by the present inventors, a liquid crystal display device (Japanese Laid-open Patent Publication No. 10-63199) that attains a degree of freedom in horizontal movement of a viewer's head without the need for spectacles.

Figure 9A:
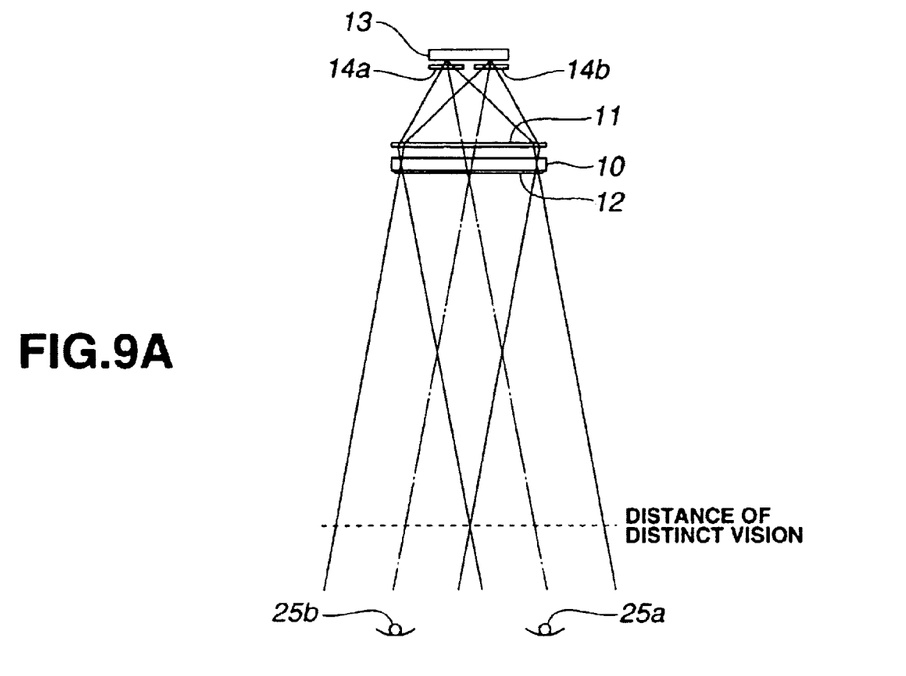
FIG. 9A is a plan view of an optical system.
Figure 9B:
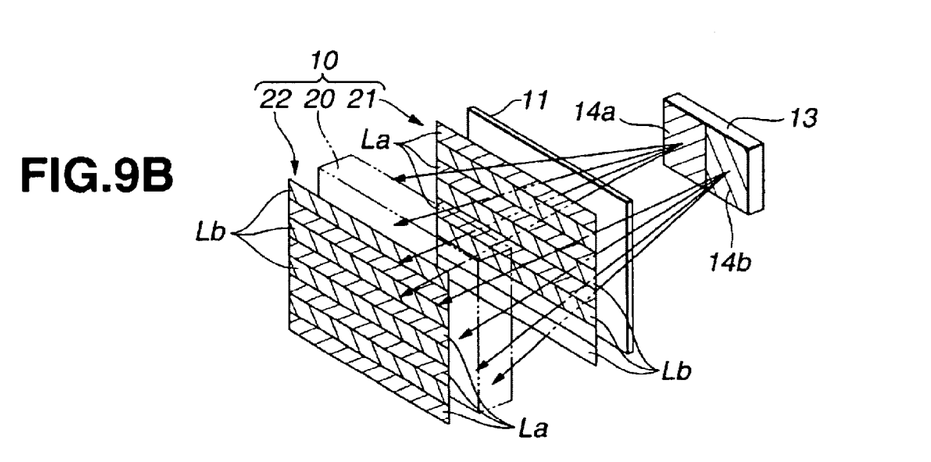
FIG. 9B is an exploded perspective view of a liquid crystal display.
Figure 10:
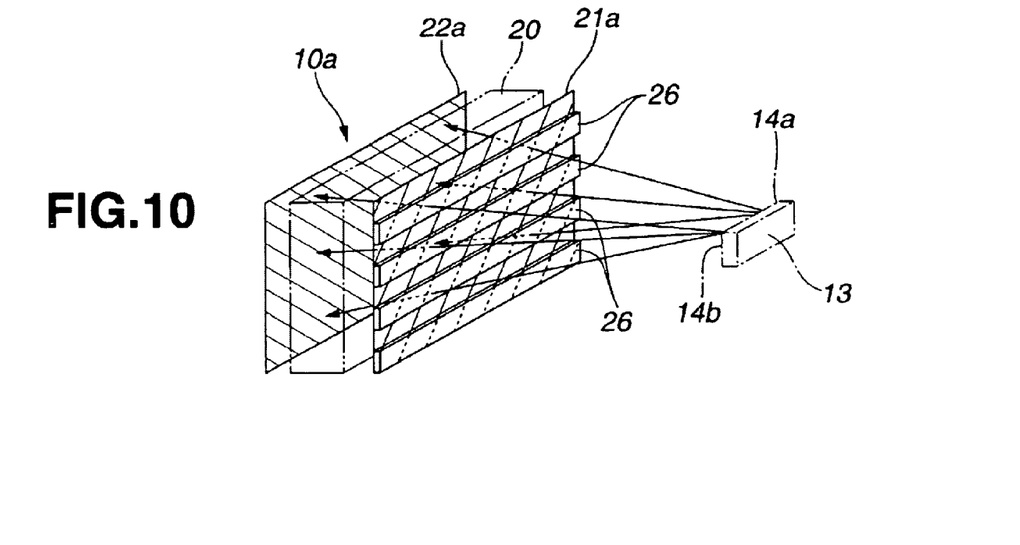
FIG. 10 is a display device to which the present invention is applicable.

The structure of the above-mentioned liquid crystal display device (Japanese Laid-open Patent Publication No. 10-63199) will be shown in FIGS. 9 to 11. In FIG. 9, a reference numeral 10 indicates a liquid crystal display unit accommodated in a housing (not shown) of the liquid crystal display device. A Fresnel lens 11 is provided in the rear of the liquid crystal display unit 10 at a location some distance therefrom. The Fresnel lens 11 has a concentrically indented lens surface on one side thereof and radiates substantially parallel rays of light by collimating light incoming from a focal point that is situated at the rear of the Fresnel lens's optical center.

A diffusing plate 12 is attached to the front side of the liquid crystal display unit 10 so that the light passing through the liquid crystal display unit 10 is radiated through the diffusing plate 12 toward a viewer. Further, a reference numeral 13 indicates a backlight as a light source for illuminating the liquid crystal display unit 10 from a rear side thereof. Right- and left-eye polarizing filters 14a and 14b are provided side by side to the front side (i.e., the light radiation side) of the backlight 13 so as to center the border between the right- and left-eye polarizing filters 14a and 14b.

The right- and left-eye polarizing filters 14a and 14b are configured to linearly polarize the light in polarizing directions orthogonal to each other. For example, the right- and left-eye polarizing filters 14a and 14b have planes of polarization along upper-right and upper-left directions, respectively, when viewed from the front.

The liquid crystal display unit 10 is of light transmission type, and has a liquid crystal panel 20 and two polarizing filters 21 and 22 provided on opposite sides of the liquid crystal panel 20 as shown in FIG. 9B. The liquid crystal panel 20 includes, e.g., a liquid crystal capable of twisting the polarization of light by an angle of 90 degrees between a pair of alignment films. When a voltage is not applied between the alignment films, the polarization of the light is rotated by an angle of 90 degrees while the light passes through the liquid crystal panel 20, and then, the light is emerged from the liquid crystal panel 20. On the other hand, when the voltage is applied between the alignment films, the light pass through the liquid crystal panel 20 without the polarization of the light being rotated.

Each of the polarizing filters 21 and 22 includes filter line portions La are Lb for linearly polarizing the light in polarizing directions orthogonal to each other. The filter line portions La and Lb are arranged alternately so as to correspond to horizontal lines of the liquid crystal panel in such a manner that the filter line portions La and Lb situated on the light source side (i.e., the rear side) face to the filter line portions Lb and La situated on the viewer side (i.e., the front side), respectively.

With the above arrangement, the rays of light from the right- and left-eye polarizing filters 14a and 14b get through the filter line portions La and Lb of the polarizing filter 21, which have the same planes of polarization as the right- and left-eye polarizing filters 14a and 14b, respectively, so as to fall on alternate horizontal lines of the liquid crystal panel. Then, the light is transmitted through the polarizing filter 22 when the voltage is not applied, and is intercepted when the voltage is applied.

Further, the liquid crystal panel 20 is configured to display right- and left-eyed image information on alternate horizontal lines thereof that are arranged so as to correspond to the light transmission lines of the polarizing filters 21 and 22.

Thus, when the viewer observes the liquid crystal display unit 10 from a distance of distinct vision (a near point), right- and left-eyed images are projected on right and left eyes 25a and 25b, respectively, so that the viewer recognizes a three-dimensional image by virtue of stereoscopic visual perception based on binocular parallax.

There is provided a liquid crystal display unit 10a as another example as shown in FIG. 10. In FIG. 10, the liquid crystal display unit 10a includes a liquid crystal panel 20 and two polarizing filters 21a and 22a provided on both sides of the liquid crystal panel 20. Although the liquid crystal panel 20 shown in FIG. 10 has the same structure as that shown in FIG. 9, the polarizing filters 21a and 22a shown in FIG. 10 are structurally different from the polarizing filters 21 and 22 shown in FIG. 9.

More specifically, each of the polarizing filters 21a and 22a is configured to have a single plane of polarization throughout its surface, while the planes of polarization of the polarizing filters 21a and 22a are set along directions orthogonal to each other. Halfwave plates 26 are attached to the polarizing filter 21a situated on the light source side, so as to correspond to alternate horizontal lines of the liquid crystal panel 20.

Figure 11A:
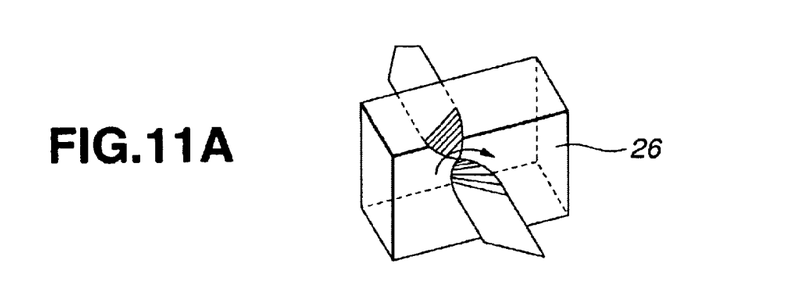
FIG. 11A is an illustration showing a polarization state in a halfwave plate.
Figure 11B:
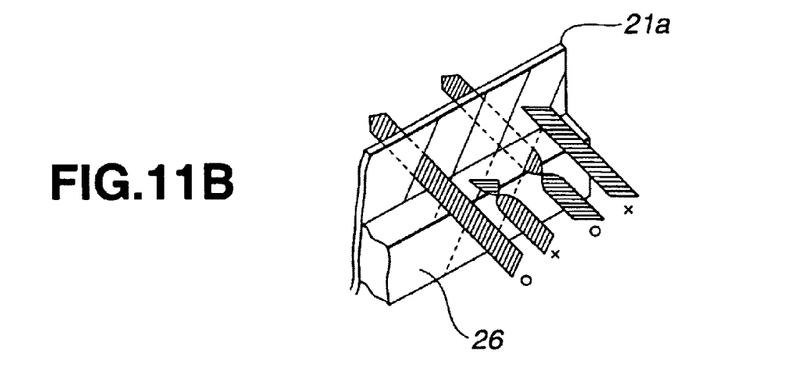
FIG. 11B is an illustration showing light incident upon a polarizing filter situated on the light source side.

As shown in FIG. 11A, the halfwave plates 26 are provided so as to rotate the polarization of light by an angle of 90 degrees and then radiate the light therefrom. In FIG. 11B, the light polarized in an upper-left direction does not pass through the lines of the polarizing filter 21a without passing through the halfwave plates 26. When the light passes through the halfwave plates 26, the polarization of light is rotated by an angle of 90 degrees so that the light is polarized in an upper-right direction and therefore passes through the lines of the polarizing filter 21a. On the other hand, the light polarized in the upper-right direction pass through the lines of the polarizing filter 21a without passing through halfwave plates 26. When the light passes through the halfwave plates 26, the polarization of light is rotated by an angle of 90 degrees so that the light is polarized in the upper-left direction and therefore does not pass through the lines of the polarizing filter 21a.

All the light just after passing through the polarizing filter 21a situated on the light source side is polarized in the upper-right direction. Accordingly, the polarizing filter 22a situated on the viewer side simply polarizes the light in the upper-left direction, thereby leading to cost reduction.

Alternatively, both of the polarizing filters 21a and 22a may have planes of polarization for linearly polarizing the light in the same direction throughout their surfaces. In such a case, the driving condition (i.e., the driving voltage) is set in reverse to the above.

Further, the light may be circularly polarized, instead of being linearly polarized. A concave mirror may be employed in place of the Fresnel lens 11.

However, it is difficult for the display devices of FIGS. 9 to 11 to attain a degree of freedom in vertical movement of the viewer's head. As a result, it is necessary to limit the position of the viewer's head.

Herein, how the display surface as in Japanese Laid-open Patent Publication No. 10-63199 responds to the positional change of the viewer's head will be explained in more detail with reference to FIGS. 12 and 13, where the pixels and the image separation mechanism are separately illustrated.

Figure 12:
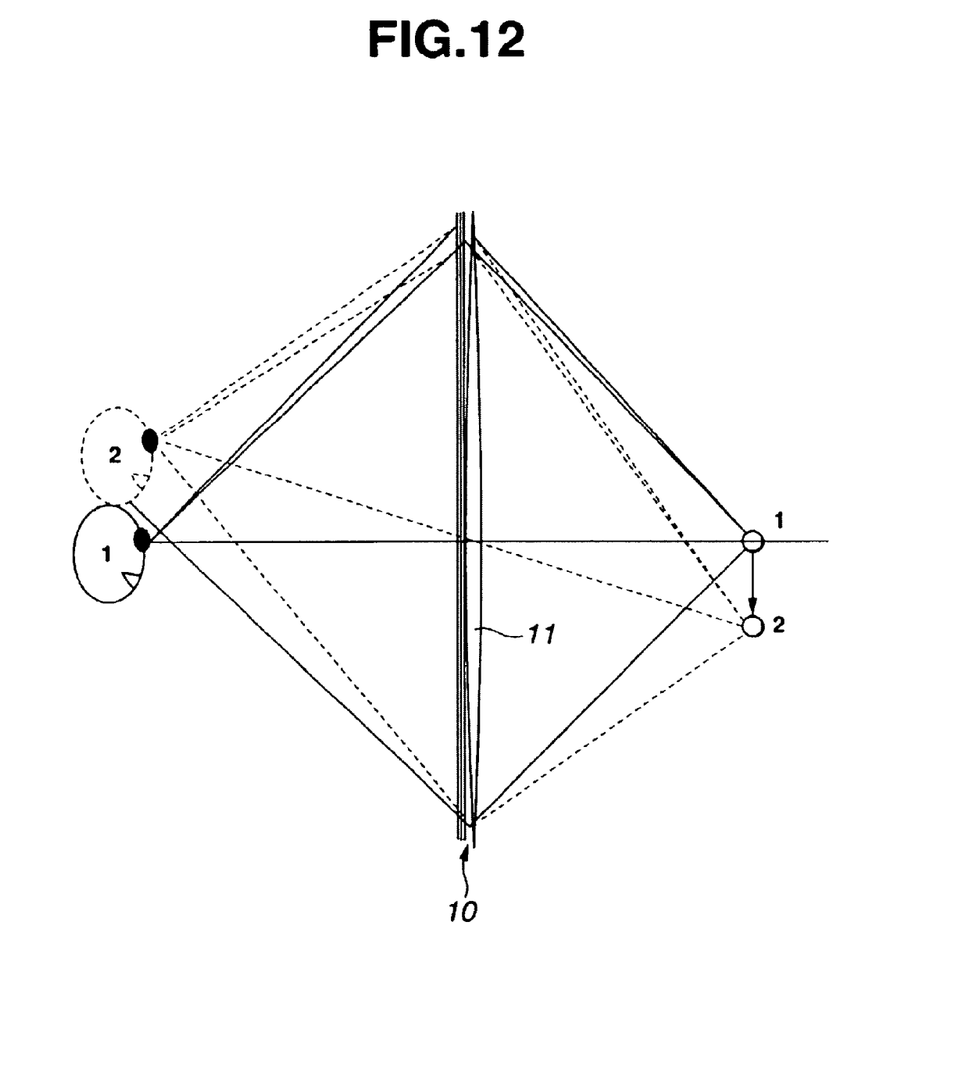
FIG. 12 is an illustration showing how a conventional display device responds to movement of a viewer's head.

FIG. 12 shows a system to respond to the vertical movement of the viewer's head by changing the position of the backlight (the light source). In any case, the system is provided so that the light emitted from the backlight (the light source) is radiated over the display surface and comes into a focus at the position of the viewer's head. The liquid crystal display unit 10 and the Fresnel lens 11 are structurally the same as those shown in FIGS. 9 to 11.

For example, when the viewer's head moves from a position indicated in a solid line to a position indicated in a broken line, the light can be brought into a focus at the position of the viewer's head indicated in the broken line by changing the position of the backlight from a position 1 to a position 2 so that the display device can respond to the vertical movement of the viewer's head as in FIG. 12.

Figure 13:
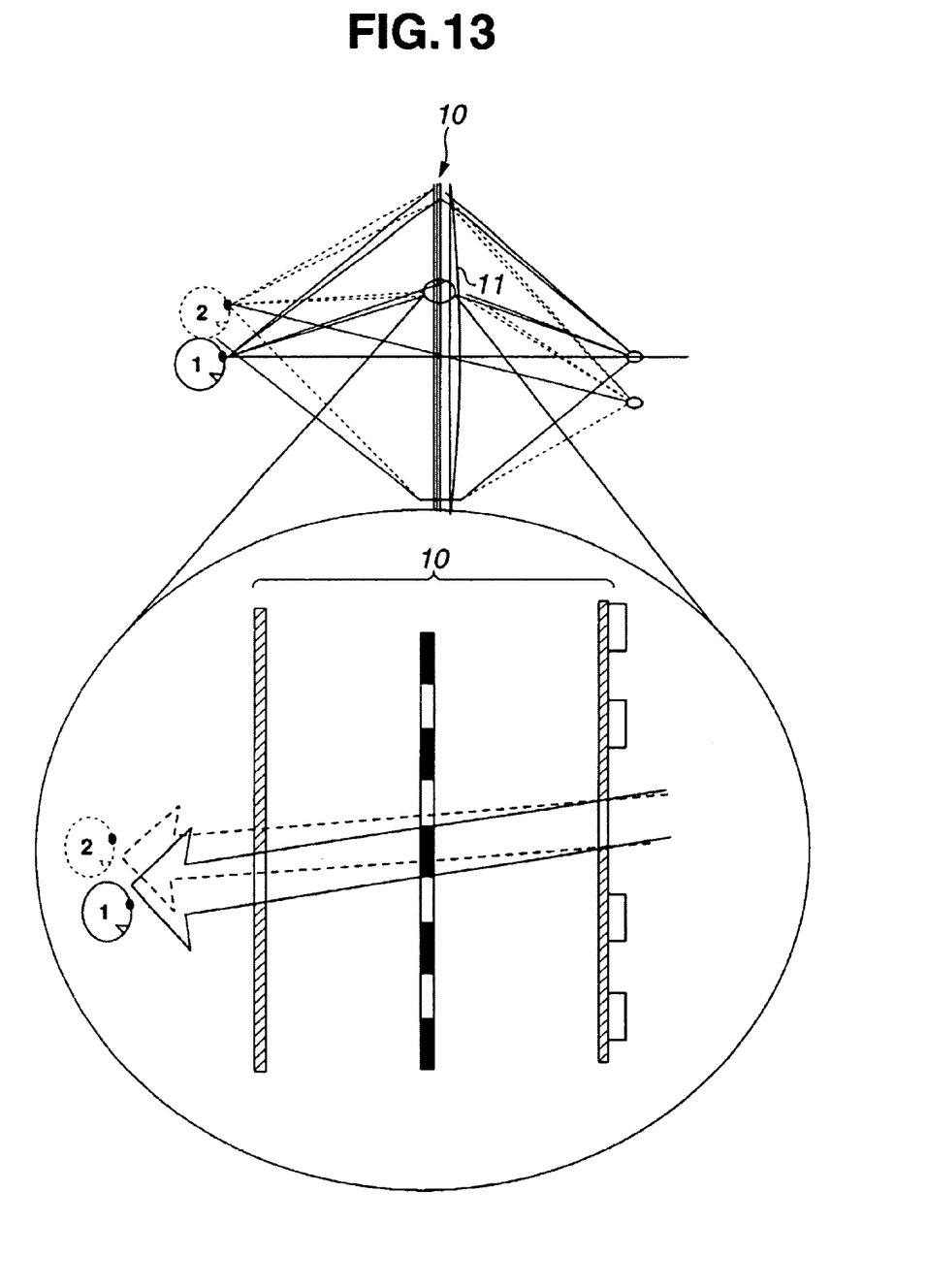
FIG. 13 is an illustration showing how crosstalk between right- and left-eyed images occurs in response to the movement of the viewer's head in the conventional display device.

FIG. 13 shows a relationship between the pixels and the image separation mechanism in more detail, taking the relationship as in FIG. 12 as an example. The bottom portion of FIG. 13 is an enlarged view showing the relationship between the pixels and the image separation mechanism. In this drawing, the pixels and the image separation mechanism correspond to the liquid crystal panel and the polarizing filter, respectively.

In FIG. 13, the right- and left-eyed images have been separated at the position of the viewer's head indicated in a solid line, as the light from the backlight reaches the viewer after passing through the image separation mechanism and then the pixels.

However, as apparent from the drawing, in the case of responding to the movement of the viewer's head from the position indicated in the solid line to the position indicated in the broken line by means of the backlight, the traveling direction of the light is changed from a solid line to a broken line. As a result, the positional relationship between the image separation mechanism and the pixels becomes inappropriate, whereby crosstalk between the right- and left-eyed images occurs.

SUMMARY OF THE INVENTION

It is an object of the present invention to provide a display system for viewing without spectacles, capable of displaying a three-dimensional image by means of two-dimensional right- and left-eyed images with less crosstalk therebetween while avoiding the necessity to wear special spectacles and to provide an image separation mechanism in pixels, and at the same time, capable of attaining an increased degree of freedom in vertical movement of a viewer's head.

The display system for viewing without spectacles according to the present invention is characterized by comprising: display means having a light transmission type display and made up of pixels forming left- and right-eyed image areas and a first image separation mechanism forming image separation portions for left and right eyes; a light source for the left and right eyes disposed in the rear of the display means by interposing first optical means having a collecting power between the light source and the display means, the light source being arranged around an focal point of the first optical means; a second image separation mechanism provided to one side of the light source nearer to the first optical means and functioning in combination with the first image separation mechanism; and light diffusing means provided in front of the display means and having a function to diffuse light in a vertical direction.

The display system for viewing without spectacles according to the present invention is further characterized by comprising second optical means having a collecting power and provided between the display means and the light diffusing means.

The display system for viewing without spectacles according to the present invention is also characterized in that the light diffusing means comprises micro-lenses arranged in random array.

Further, the display system for viewing without spectacles according to the present invention is characterized in that the light diffusing means comprises a micro-lens array including a plurality of micro-lenses formed so as to extend in a horizontal direction of a display surface of the display means and arranged at random.

The display system for viewing without spectacles according to the present invention is also characterized in that the light source is formed in the shape of a line or a band extending in a direction that connects luminous sources for the left and right eyes.

The display system for viewing without spectacles according to the present invention is characterized in that the light source emits light of different wavelengths from the luminous sources for the left and right eyes.

The display system for viewing without spectacles according to the present invention is characterized in that each of the first and second image separation mechanisms comprises polarizing elements that have different polarizing directions for the left and right eyes.

The display system for viewing without spectacles according to the present invention is characterized in that each of the first and second image separation mechanisms comprises different color filters for the left and right eyes.

With the above arrangements, it becomes possible to attain a degree of freedom in the vertical movement of the viewer's head while separating the right- and left-eyed images to the right and left eyes precisely.

BRIEF DESCRIPTION OF DRAWINGS

FIG. 4 shows specific examples of light diffusing means according to the embodiment of the present invention.

FIG. 5 shows the structures of the embodiment according to the present invention.

FIG. 7 shows the structures of the embodiment according to the present invention.

FIG. 8 shows another specific example of light diffusing means according to the embodiment of the present invention.

FIG. 9 shows a display device to which the present invention is applicable.

FIG. 11 is a display device to which the present invention is applicable.

DETAILED DESCRIPTION OF THE INVENTION

Figure 1:
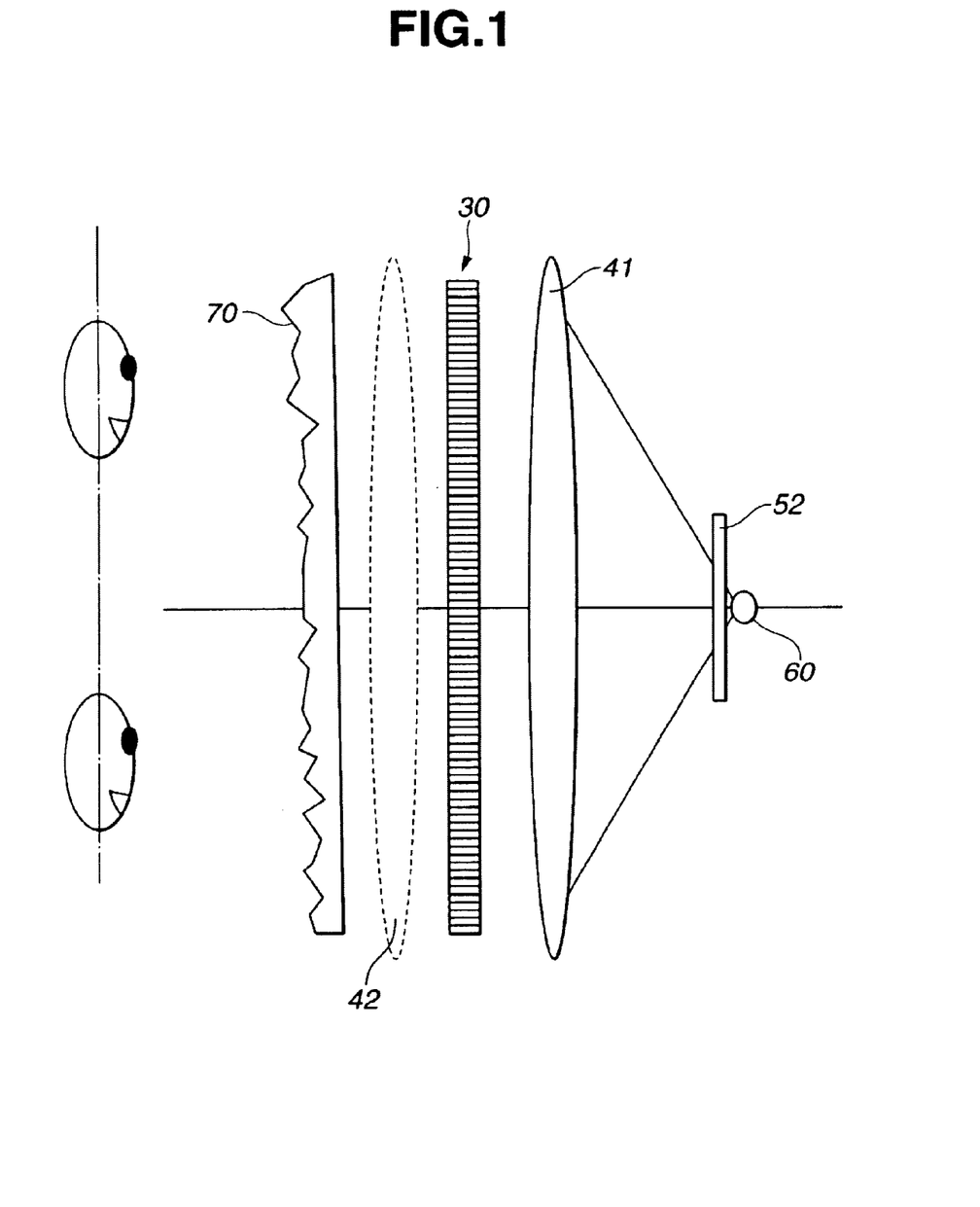
FIG. 1 is an illustration conceptually showing a structure of one embodiment according to the present invention.
Figure 2:
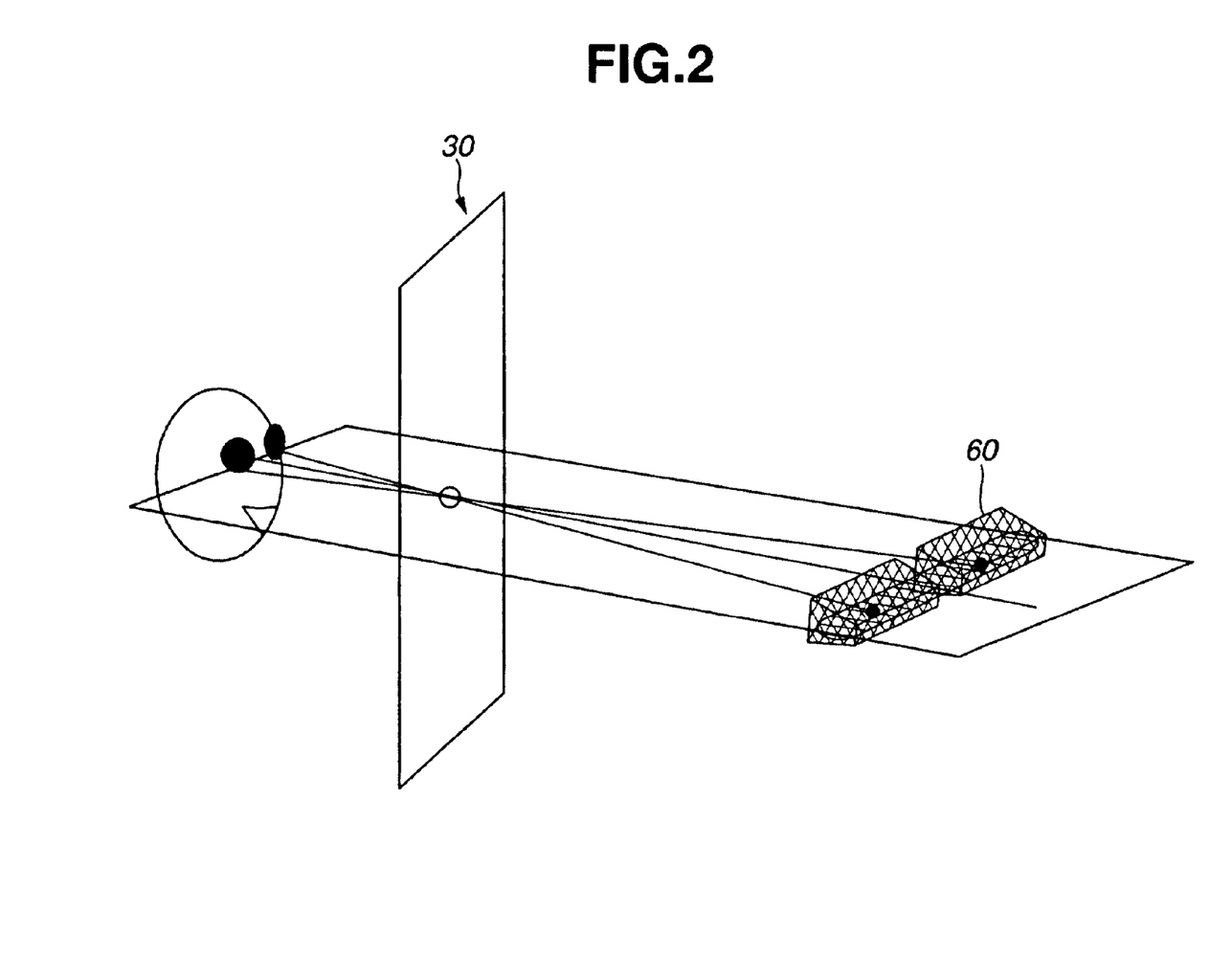
FIG. 2 is a perspective view showing a substantial part of the structure of the embodiment according to the present invention.
Figure 3:
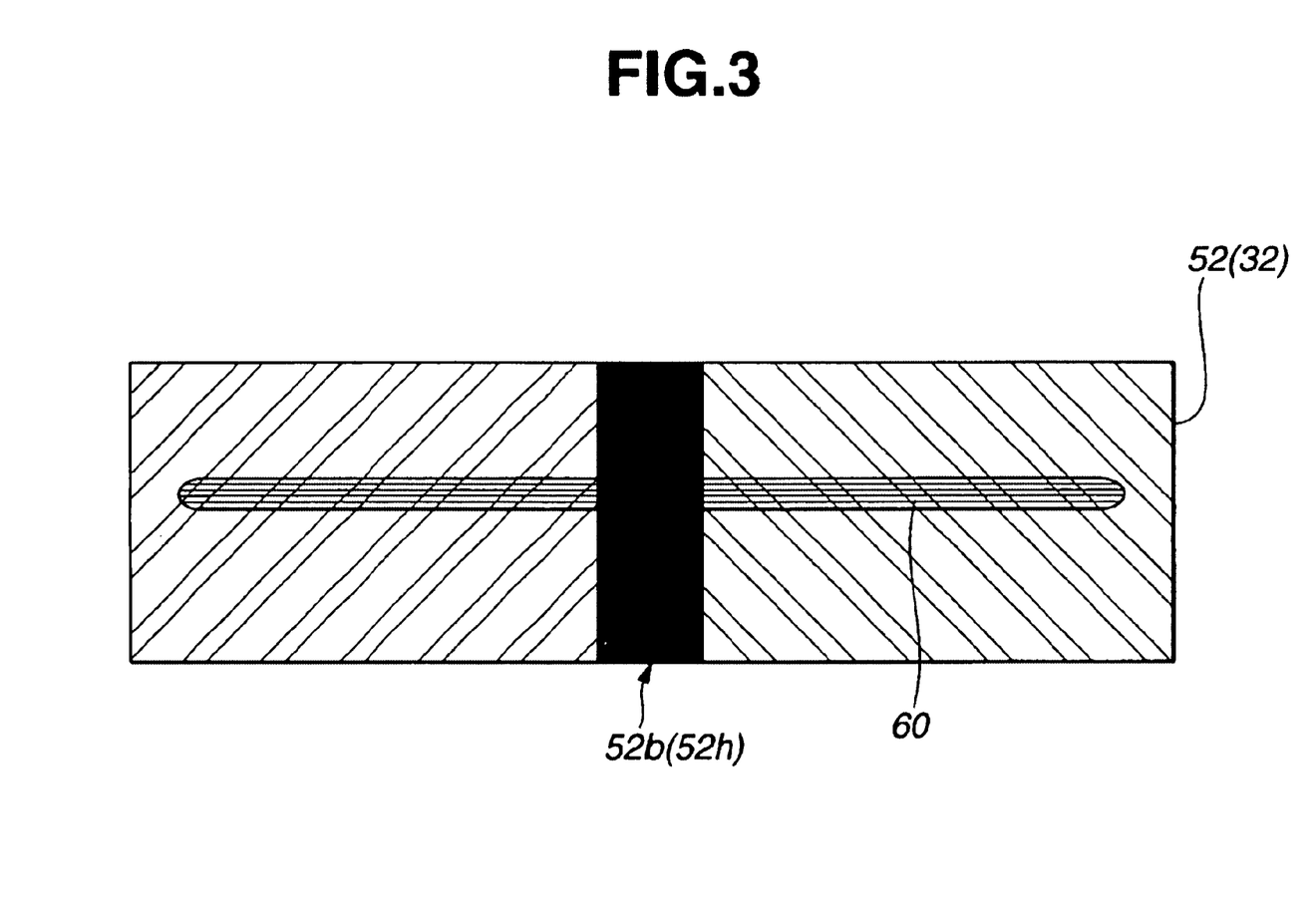
FIG. 3 is an illustration showing a light source, when viewed from the viewer side, according to the embodiment of the present invention.
Figure 6:
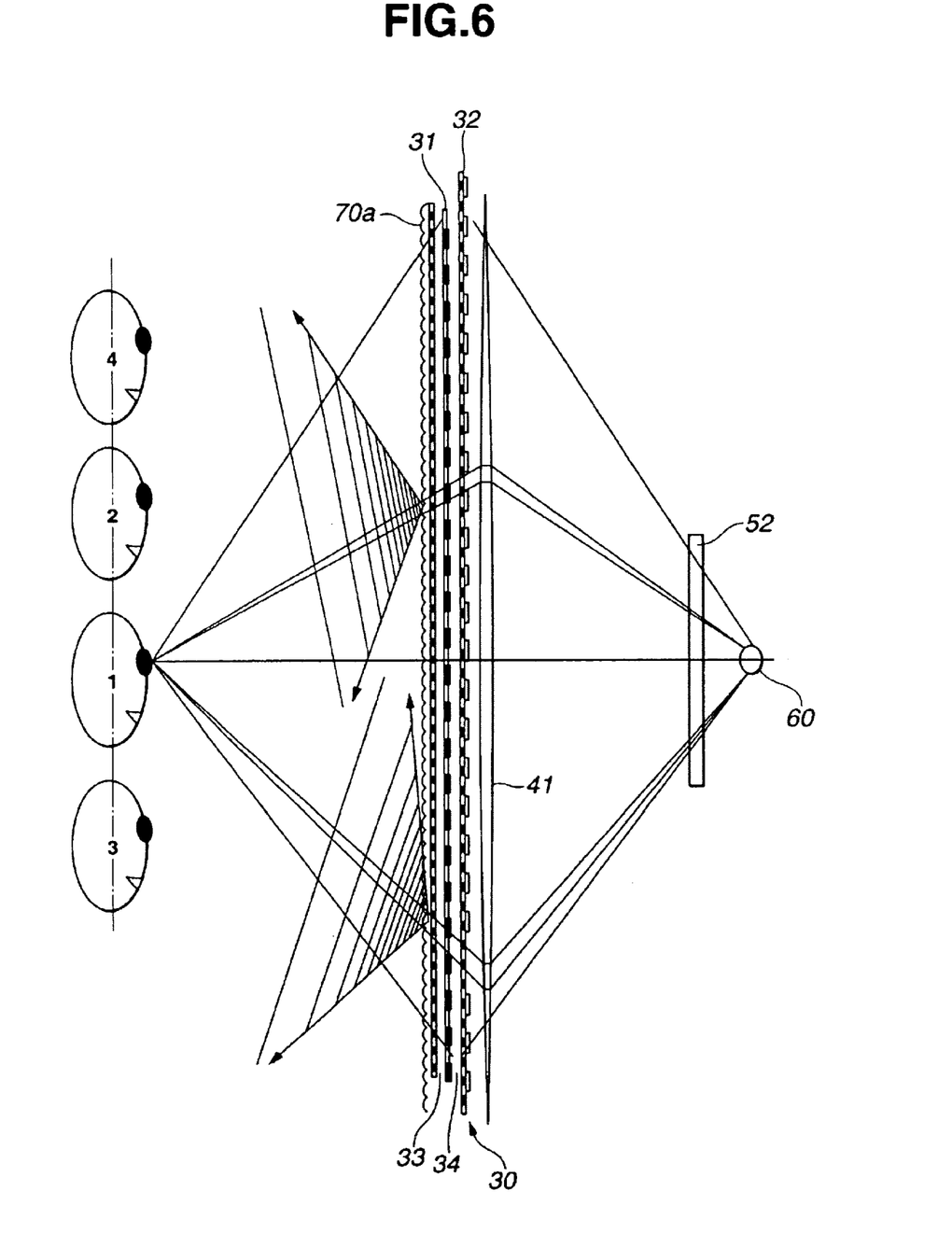
FIG. 6 is an illustration showing the embodiment according to the present invention.

Hereinafter, embodiments of the present invention will be explained with reference to the drawings. Firstly, FIG. 1 is an illustration conceptually showing the structure of one embodiment according to the present invention. FIGS. 2 and 3 shows one detailed example of a backlight used in the present invention. FIGS. 4 and 6 shows specific examples of light diffusing means and their uses.

FIG. 1 is a vertical sectional view of a display system capable of displaying a right-eyed image (or a left-eyed image) in such a manner that the image can be viewed from vertically different positions of a viewer according to the invention. In FIG. 1, a reference numeral 30 indicates display means comprising a light transmission display, such as a liquid crystal display, provided with pixels (31) that form left- and right-eyed image areas and a first image separation mechanism (32) for polarizing the rays of light in different polarizing directions for left and right eyes.

A light sources 60 is provided in the rear of the display means 30 through a lens unit 41 (first optical means) having a collecting power and a second image separation mechanism 52 (polarizing filter portions) therebetween, thereby performing different functions for the left and right eyes.

A light diffusing plate 70 (light diffusing means) having the function of diffusing the rays of light in a vertical direction is provided at the front of the display means 30 through a lens unit 42 (second optical means) that directs the light from the display means 30 toward the viewer's head.

Each of the lens units 41 and 42 (the first and second optical means) includes a combination of a convex lens, a Fresnel convex lens, a concave mirror, an aspheric lens and an aspheric mirror. Further, the light source 60 for the left and right eyes is placed so that the image separation function becomes effective by combination of the image separation means (32, 52).

The image separation function can be achieved by the use of, e.g., the light linearly polarized in directions orthogonal to each other, the light circularly polarized in different directions or the light with different wavelengths (e.g., red and blue) for the right and left eyes. Although the location and shape of the backlight (the light source 60) are described later in detail, it is desirable that the backlight be small-sized and in the form of a point or a line so as to avoid causing crosstalk between the left- and right-eyed images.

The display means 30 is of light transmission type, and can be achieved by, e.g., a liquid crystal display (hereinafter abbreviated to LCD), a film or a slide. As shown in FIG. 6 mentioned below, the display means 30 includes pixels 31 that form left- and right-eyed image areas alternately and an image separation mechanism 32 in which right- and left-eye image separation portions are alternately formed. The pixels 31 and the image separation mechanism 32 are disposed in place by means of transparent glass sheets 33 and 34 having predetermined thickness.

The image separation portions are provided so that the rays of light from the backlight for the right (left) eye pass through the right-eye (left-eye) image separation portions and then the right-eyed (left-eyed) image areas.

The light diffusing plate 70 is any plate having the function of diffusing the rays of light in the vertical direction, and can be achieved by a sheet-type light diffusing plate that includes a combination of a plurality of lenses, such as concave lenses, convex lenses and/or aspheric lenses.

FIGS. 2 and 3 shows one example of the backlight (the light source 60) according to the embodiment. FIG. 2 is a perspective view showing the positional relationship between the backlight and the viewer. As shown in the drawings, the light source 60 is provided so that the display surface is illuminated brightly with the rays of light coming from the light source 60 via the first and second optical means (the lens units 41 and 42, not shown in the drawing), when viewed from the position of the viewer's right (left) eye.

More specifically, the backlight (the light source 60) for the right and left eyes Is arranged across a line that connects a midpoint between the viewers left and right eyes and the optical center of the first optical means (the lens 41), as shown in FIG. 2. That is, the backlight is arranged at a focal point of the first optical means and orientated along a direction perpendicular to the above line.

FIG. 3 shows the shape of the backlight as one example, when viewed from the viewer side. In the drawing, the diagonally shaded areas indicate the second image separation mechanism 52 attached to the backlight (the light source 60) for the left and right eyes. In this embodiment, the light source 60 is in the form of a line or a band extending in a direction that connects two luminous sources for the left and right eyes at the above position in order to increase a degree of freedom in horizontal movement of the viewer's head, although the light source 60 may be in the form of a point arranged at the above position. Further, a blackout area 52b or a blank area 52h may be provided between the luminous sources for the left and right eyes. It becomes therefore possible to attain high resolution for the right- and left-eyed images by combination of the above-mentioned backlight (the light source 60) and the image separation portions provided in the display surface of the display means.

FIG. 4 shows the light diffusing means (the light diffusing plate 70) that has the function of diffusing the rays of light in the vertical direction according to the embodiment. The arrows in the drawing indicate the rays of light radiated from the left-eyed image areas (or right-eyed image areas) of the display means 30. The rays of incident right are considered to be substantially collimated, as shown in the drawing.

Figure 4A:
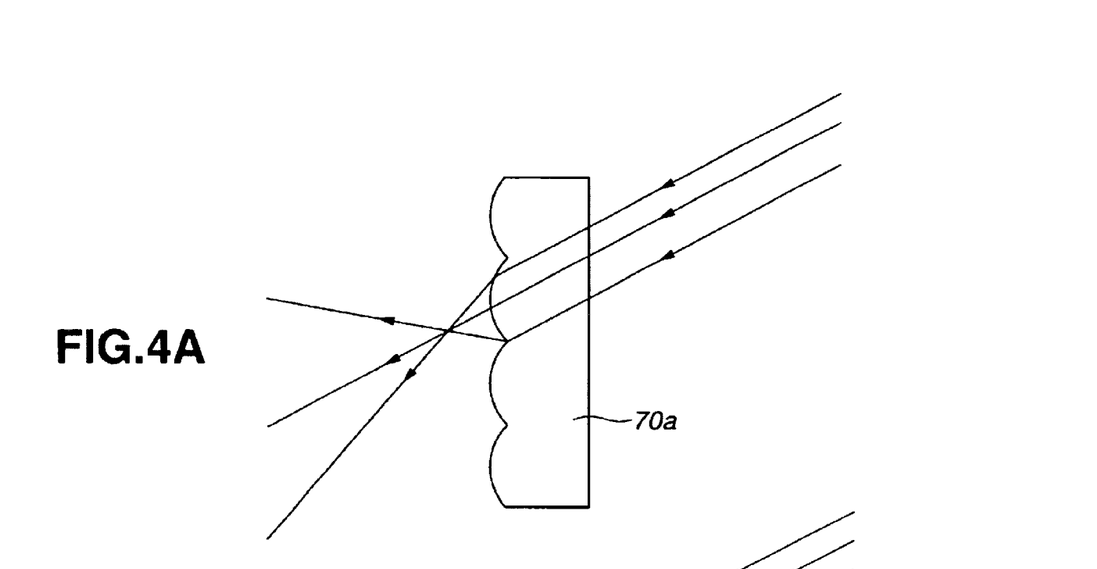
FIG. 4A is a sectional view of the light diffusing means of convex lens type.
Figure 4B:
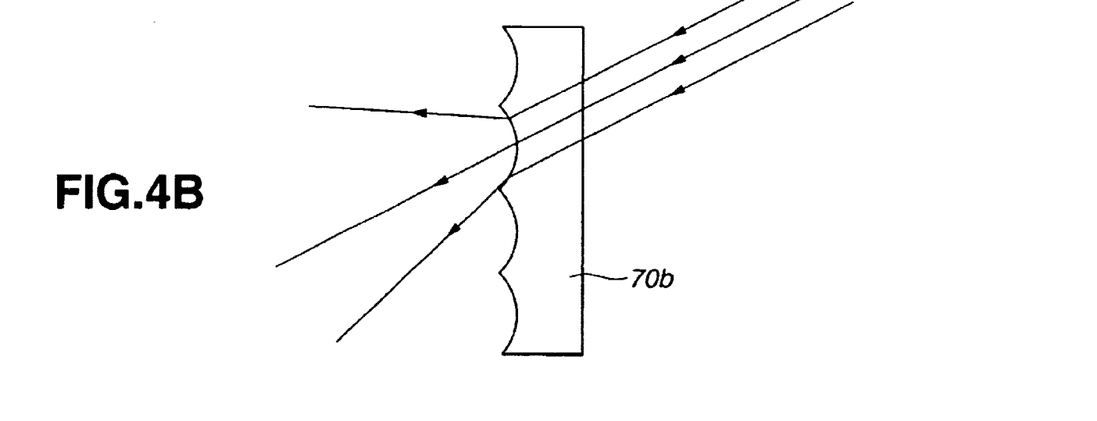
FIG. 4B is a sectional view of the light diffusing means of concave lens type.

FIG. 4A shows a light diffusing plate 70a made of a sheet of an array of convex lenses. FIG. 4B shows a light diffusing plate 70b made of a sheet of an array of concave lenses. With such arrangements, the rays of the light from the display surfaces follow the paths as illustrated in the drawings.

The convex and concave lenses of the light diffusing means are not necessarily formed in spherical shapes, and may be formed in aspherical shapes or shapes of sine wave. It is desirable that each lens has a vertical length equal to or smaller than the size of one pixel of the display surface. The spread of the light rays may be adjusted by regulating the focal length of the lens. Each of the above lens arrays is preferably comprised of cylindrical lenses so as to prevent the light from being scattered in a horizontal direction. The spread of the light rays in the horizontal direction causes crosstalk between the right- and left-eyed images. It is therefore desirable to minimize such a horizontal spread, and at least necessary to prevent the light from the right-eyed image areas (or the left-eyed image areas) from being scattered in such a manner as to enter into the left eye (or the right eye). Also, the lens and sheet are preferably made of transparent material.

FIG. 5 is a sectional view of the display system wherein the light diffusing means (e.g., the light diffusing plate 70a) is provided at the front of the light source 50, the second image separation mechanism 52, the first optical means (not shown in the drawing) and the display surface of the display means 30. Meanwhile, the second optical means (the lens unit 42) is omitted from FIG. 5.

Figure 5A:
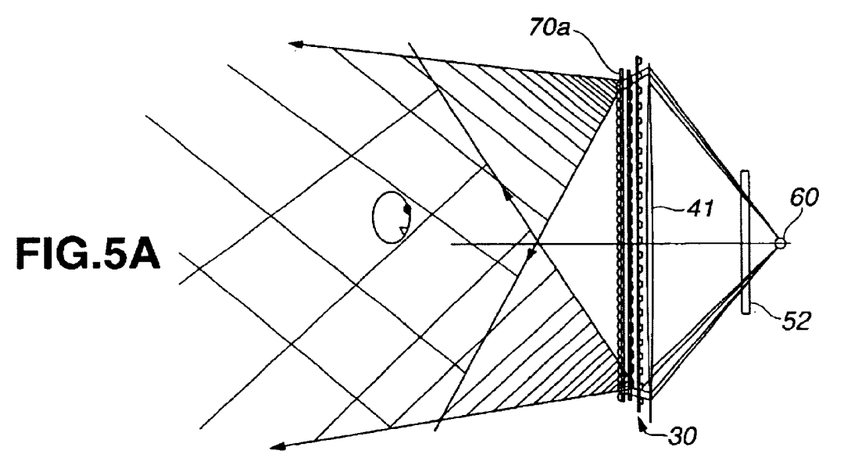
FIG. 5A shows the structure of the embodiment provided with the light diffusing means of short focal length.
Figure 5B:
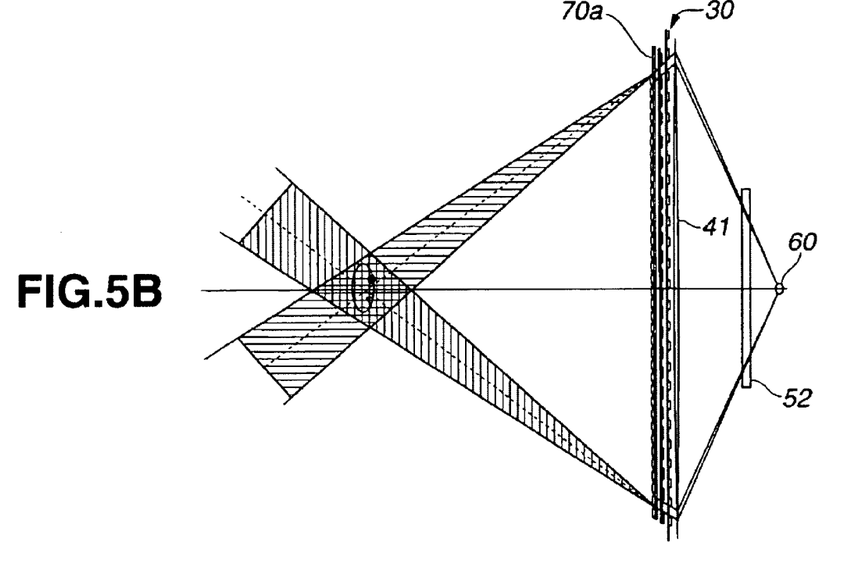
FIG. 5B shows the structure of the embodiment provided with the light diffusing means of long focal length.

FIG. 5A shows the display system in which the lens array of the light diffusing plate 70a has a short focal length, while FIG. 5B shows and the display system in which the lens array of the light diffusing plate 70a has a long focal length. In the drawings, the diagonally shaded areas indicate view enable areas from which the peripheral portions of the display surfaces can be viewed. The areas in grid patterns indicate view enable areas from which the whole of the display surfaces can be viewed. The light emitted from the light source 60 is radiated over the display surface, and then, separated by the image separation mechanism of the display means 30 so as to converge on the right and left eyes in such a manner that the right- and left-eyed images are separated, respectively. The light is diffused by the light diffusing plate 70a only in the vertical direction, as shown in the drawing, so as to expand the above view enable areas.

As apparent from the drawings, it is possible to adjust the view enable areas to any size. However, broadening the view enable areas results in the spread of the light from the backlight (the light source 60) in focus at the viewer's position with a predetermined light amount, thereby making vision dark. Needless to say, it is therefore preferable to match possible positions of the viewer's head with the view enable areas.

FIG. 6 shows a positional relationship between the viewer's head and the display system provided with the light diffusing means according to the present invention in more detail. The light from the light source 60 passes through the second image separation mechanism 52, the lens unit 41 (the first optical means), the corresponding portions of the first image separation mechanism 32, the corresponding areas of the pixels 31 and then the light diffusing plate 70 and travels so as to converge on the right and left eyes of the viewer. Herein, the second optical means (the lens unit 42) is omitted from FIG. 6.

If the light diffusing plate 70a were not provided, the light would converge only on a viewer's position 1. Accordingly, the image on the display surface could be viewed only if the viewer's head were positioned at the position 1. The image could not be viewed from viewer's positions 2 to 4 displaced vertically from the position 1. However, when the light diffusing plate 70a is provided according to the invention, the rays of light spread out in the vertical direction, as shown in the drawing. Such spread of the light rays occurs over the whole of the display surface. It becomes possible to view the image on the display surface from any of the points 1 to 4 and increase a degree of freedom in vertical (up-and-down) movement of the viewer's head.

Figure 7A:
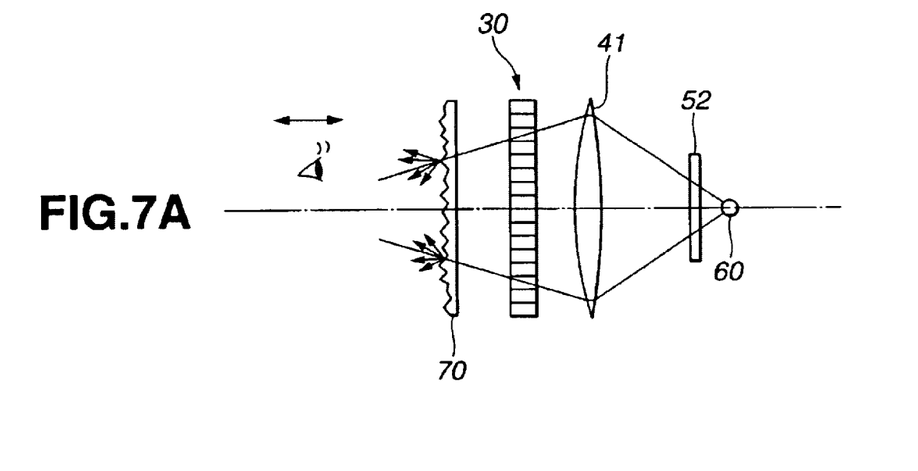
FIG. 7A shows the structure of the embodiment provided without second optical means.

As shown in FIG. 7A, the lens unit 42 (the second optical means) may not be provided between the display means 30 and the light diffusing plate 70. In this case, it is possible to respond to the positional change in the viewer's eyepoint in a direction of optical axis (i.e., a depth direction) by moving the light source 60 (or replacing the lens unit 41). However, the pitches of the image separation portions (the image separation filter) of the display means 30 have to be modified.

Figure 7B:
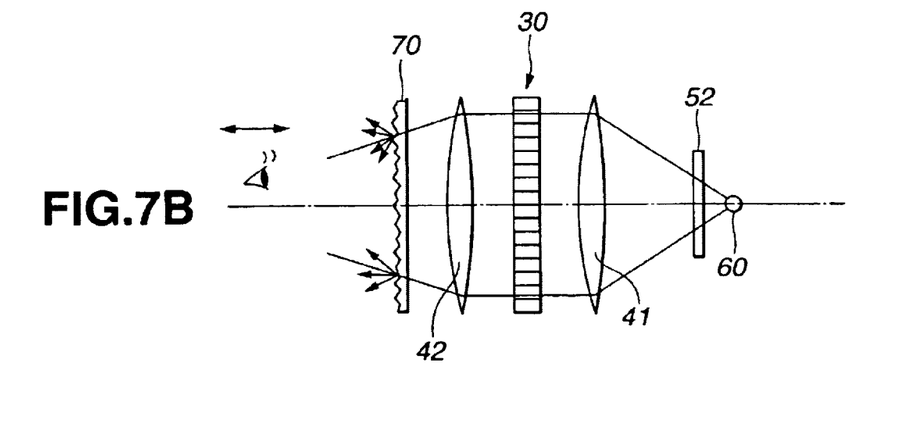
FIG. 7B shows the structure of the embodiment provided with the second optical means.

On the other hand, when the lens unit 42 (the second optical means) is provided as shown in FIG. 7B, it is possible to respond to the positional change in the viewer's eyepoint in the direction of optical axis (the depth direction) just by replacing the lens unit 42.

To avoid moire phenomenon from occurring in relation to the pixels, the image separation portions (the image separation filter) and the pitches of the Fresnel lens patterns, the light diffusing means preferably comprises micro-lenses arranged in random array. (Herein, the moire phenomenon means the occurrence of fringes on the image due to interference between the concentrically patterned portions of the lens and the liquid crystal elements.)

Figure 8A:
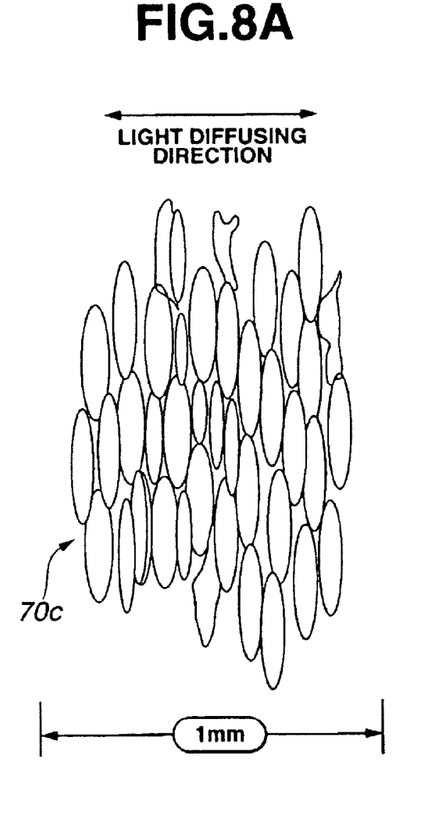
FIG. 8A is a plan view of the light diffusing means.

FIG. 8 shows another example of the light diffusing means (the light diffusing plate 70) according to the embodiment of the present invention. As shown in FIG. 8a, a light diffusing plate 70c of this embodiment comprises a micro-lens array including a plurality of micro-lenses arranged at random.

Figures 8B, 8C:
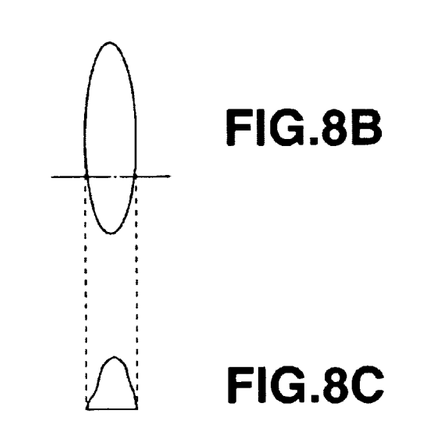
FIG. 8B is an elevational view of a micro-lens.
FIG. 8C is a sectional view of the micro-lens of FIG. 8B.

Each micro-lens in the micro-lens array is formed so as to extend in the horizontal direction of the display surface of the display means 30. Each micro-lens is preferably in a vertically and horizontally anisotropic shape when viewed from the front, such as an oval shape, as shown in FIG. 8B and in a shape of a protrusion in cross-section as shown in FIG. 8C.

Although the micro-lens is illustrated with the cross-sectional profile as in FIG. 8, it is not limited to the above and may be in any form capable of producing the effect of lens. For example, the micro-lens may be a concave lens or in the form of protrusion. The micro-lens may be a combination lens produced by laminating materials having different refraction indexes in the direction of thickness.

Each lens has a vertical length of preferably equal to or smaller than the size of one pixel, and at the same time, necessarily equal to or greater than the wavelength of the light. In order to maximize the light diffusing effect, it is preferable that the lenses are arranged so as not to create clearance therebetween when viewed from the front. However, the locations and sizes of the lenses are restricted severely in order to avoid the moire fringes caused owing to the interference between the pixels, the image separation portions (the image separation filter), the pitches of the Fresnel lens patterns and the array of the micro-lenses.

For example, the micro-lenses preferably have random locations, sizes, shapes and lens curvatures. The sizes of the micro-lenses are preferably much smaller than those of the pixels.

The sheet-type light diffusing means may be bonded to the display surface of the display means. In such a case, the light diffusing means may include a glue, an adhesive or the like, which does not disturb the light diffusing function, applied on one side thereof nearer to the display surface.

In a case where the light diffusing plate is provided on the outermost of the display device, it is necessary to prevent the light diffusing plate from loosing its function because of external factors, such as humidity, temperature, light, and wear and tear. In order to minimize the effect of external scattered light, it is desirable to treat the outermost surface of the light diffusing plate according to any conventional method for preventing surface reflection. It is necessary to avoid affecting the images displayed on the display surface by coloring the light diffusing plate.

Further, the light diffusing means (the light diffusing plates 70, 70a, 70b and 70c) may include a transparent medium, such as a glass, on at least one side thereof.

The display system to which the present invention can be applied may have the following characteristics other than the above. For example, the display system may be characterized in that each of the first and second optical means include combinations of a convex lens, a Fresnel convex lens, cylindrical concave mirror, an aspheric mirror and the like.

Further, the display system may be characterized in that the first and second optical means are combined into one.

The display system may be characterized in that the light diffusing means is sheet-shaped and includes a combination of a plurality of convex lenses, concave lenses, aspheric lenses and/or cylindrical lenses.

The display system may be characterized in that the light source for the left and right eyes emits linearly polarized light, circularly polarized light or light of different wavelengths, e.g., of red and blue.

The display system may be characterized in that the image separation mechanisms separates linearly polarized light, circularly polarized light or light of different wavelengths, e.g., of red and blue.

The display system may be characterized in that the image separation mechanism comprises a linear polarization plate arranged so as to face to the light radiation side of the backlight (the light source) and halfwave plates provided to alternate horizontal lines of the linear polarization plate on the light source side thereof.

The display system may be characterized in that the light diffusing direction of the light diffusing means is orthogonal to the image separation direction of the image separation mechanism.

The display system may be characterized that the light diffusing direction of the light diffusing means is orthogonal to a direction that connects the viewer's left and right eyes.

As described above, according to the present invention, it becomes possible to permit a display with less crosstalk between left- and right-eyed images at low cost without the necessity to wear spectacles as well as to provide an image separation mechanism in pixels, and at the same time, possible to significantly increase a degree of freedom in a vertical position of the viewer's head.

Further, it is possible to provide a display system that attains an increased degree of freedom in horizontal and vertical movement of the viewer's head by applying the present invention to a display device (patent previously applied for) that attained an increased degree of freedom in a horizontal position of the viewer's head.

INDUSTRIAL APPLICABILITY

The present invention is not limited to the above embodiments, and can be applied to any other display device for viewing a stereoscopic image without spectacles.

What is claimed is:

1. A display system for viewing without spectacles, comprising:
    display means having a light transmission type display, and made up of pixels that form left- and right-eyed image areas and a first image separation mechanism forming image separation portions for left and right eyes;
    a light source for the left and right eyes disposed in the rear of the display means by interposing first optical means having a collecting power between the light source and the display means, the light source being arranged around a focal point of the first optical means;
    a second image separation mechanism provided to one side of the light source nearer to the first optical means and functioning in combination with the first image separation mechanism; and
    light diffusing means provided in the front of the display means for diffusing light in a vertical direction, the light diffusing means comprising a plurality of micro-lenses formed so as to extend in a horizontal direction from a disylay surface of the display means and arranged at random.

2. The display system for viewing without spectacles according to claim 1, further comprising second optical means having a collecting power and provided between the display means and the light diffusing means.

3. The display system for viewing without spectacles according to claim 2, wherein the light source is formed in the shape of a line or a band extending in a direction that connects luminous sources for the left and right eyes.

4. The display system for viewing without spectacles according claim 2, wherein the light source emits light of different wavelengths from the luminous sources for the left and right eyes.

5. The display system for viewing without spectacles according to claim 1, wherein the light source is formed in the shape of a line or a band extending in a direction that connects luminous sources for left and right eyes.

6. The display system for viewing without spectacles according claim 1, wherein the light source emits light of different wavelengths from the luminous sources for the left and right eyes.

7. The display system for viewing without spectacles according to claim 1, wherein each of the first and second image separation mechanisms includes polarizing elements that have different polarizing directions for the left and right eyes.

8. The display system for viewing without spectacles according claim 1, wherein each of the first and second image separation mechanisms includes different color filters for the left and right eyes.

* * * * *